July 21, 1953
L. S. WILLIAMS
2,646,271
BALL AND SOCKET STRUT
Filed May 10, 1950
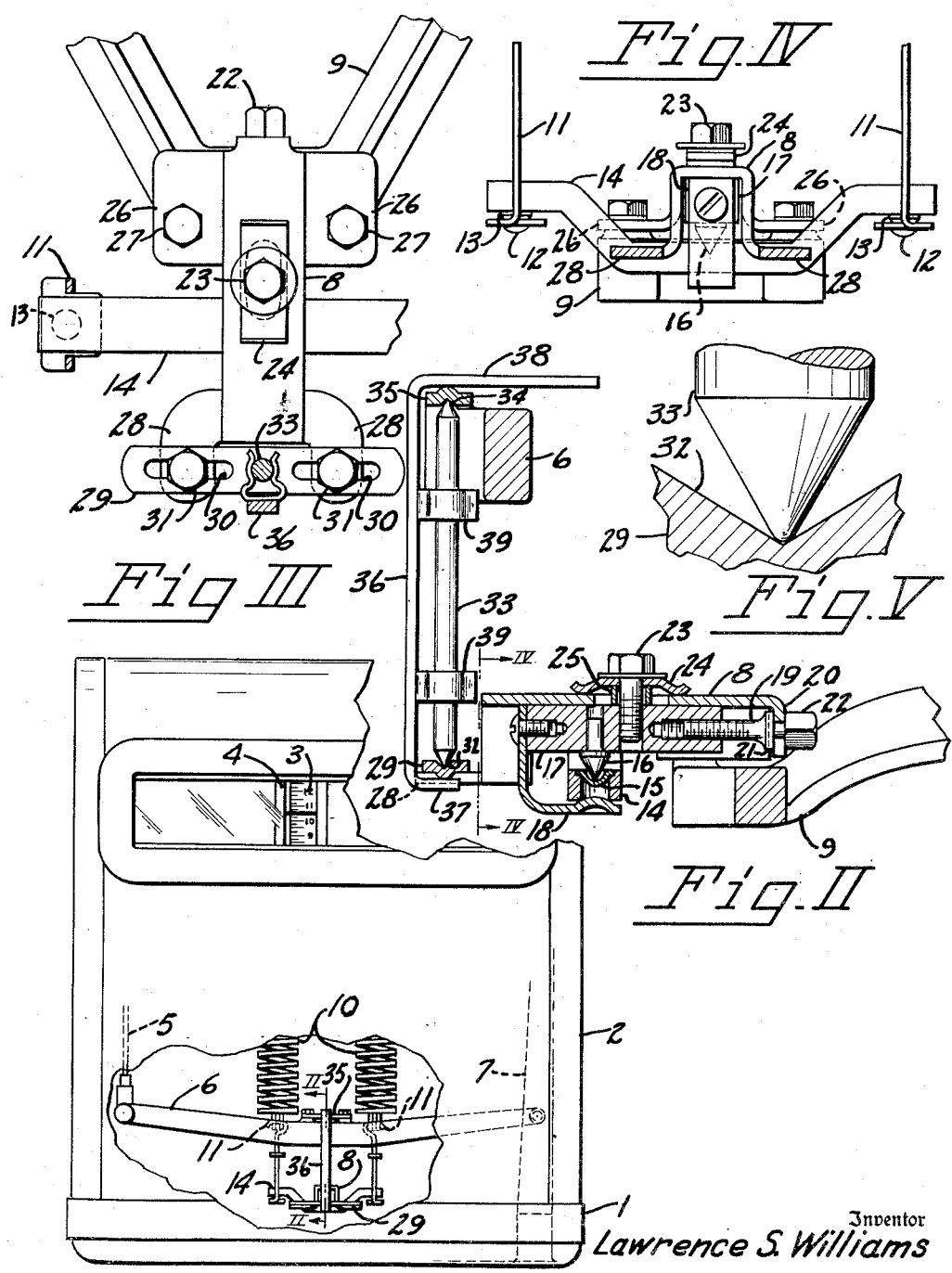
Inventor
Lawrence S. Williams
By Marshall, Marshall & Leonard
Attorneys Patented July 21, 1953

2,646,271

UNITED STATES PATENT OFFICE 2,646,271

BALL AND SOCKET STRUT

Lawrence S. Williams, Toledo, Ohio, assignor to Toledo Scale Company, Toledo, Ohio, a corporation of New Jersey Application May 10, 1950, Serial No. 161,195

4 Claims. (Cl. 265—27)

This invention relates to weighing scales and in particular to an improved structure for interconnecting levers of a weighing scale and is of particular advantage when the transmitted force is small but precise dimensional stability is required.

It has been customary when push connections between levers are required in the design of certain weighing scales to interconnect the levers by means of links that are connected to the levers by pin connections. In order to reduce the amount of friction in this type of connection hardened cylindrical pins engaging hardened sides of square holes in the links are employed as pivotal connections. In this arrangement the contact between the pin at each end of the link and the sides of the hole in the link is confined to a line along one side of the pin. This type of construction suffers from the defect that friction is often developed between the link and thrust stops that prevent lateral movement of the link along the pin. Friction also develops as wear occurs between the parts. Furthermore small variations in the lateral position of the strut produce relatively large errors in indication.

The principal object of this invention is to provide an improved lever connecting assembly that is simple to construct and that maintains precise dimensional stability between the interconnected levers.

Another object of the invention is to provide a lever connecting assembly that is positively maintained in alignment without the use of special aligning devices.

A still further object of the invention is to provide an assembly that is easily disassembled without the use of tools should it be necessary to inspect or replace portions of the assembly.

More specific objects and advantages are apparent from the following description of a preferred embodiment of the invention which is illustrated in the accompanying drawings.

In the drawings:

Figure I is an elevation, with parts broken away, of a weighing scale embodying the invention.

Figure II is a fragmentary side elevation of the free end of a load receiving lever and the link connection to another lever of the scale as seen from the line II—II of Figure I.

Figure III is an enlarged fragmentary plan view of the end of the weighing scale lever.

Figure IV is an end elevation of the end of the lever.

Figure V is a greatly enlarged detailed view showing the cooperation of the improved lever connecting member with the portions attached to the levers.

These specific figures and the accompanying description are intended merely to illustrate the invention and not to impose limitations on its scope.

The improved lever connecting mechanism is particularly useful in a spring counterbalance weighing scale of the type ordinarily used in retail stores. The improved connecting mechanism is employed as a connection between a transverse lever of the scale and a weighing lever of the scale to drive the transverse lever through such distances that a weighing scale chart operatively connected to the lever accurately indicates the load being counterbalanced. Since the positions of the weighing scale lever under the influence of the applied load is determined by load counterbalancing springs it is necessary that all backlash or uncertainty of position of the transverse lever with respect to the main lever be eliminated if the scale is to accurately indicate the load being weighed.

Referring now to the drawings, Figure I shows the customer's side of a counter type weighing scale. Such a scale comprises a base 1, a housing 2 erected from the base and, in its upper portion, enclosing an indicia bearing chart 3, a portion of which is visible through a window 4. The chart 3, in the form of a rotatable cylinder, is driven by a rack rod 5 carried on the end of a transverse chart drive lever 6 pivotally mounted on a standard 7 erected from the base 1. A bracket assembly 8 generally similar to a nose iron is mounted on the end of a load supporting main lever 9 of the scale and is operatively connected to and supported by a pair of load counterbalancing springs 10. The transverse chart drive lever 6 and the bracket assembly 8 are connected so that movement of the main lever 9 in response to loads on the scale causes corresponding movements of the transverse chart drive lever 6 and the indicia bearing chart 3.

The load counterbalancing springs 10 are, at their lower ends, connected to hooks 11 fitted with bearings 12 to engage cone pointed pivots 13 mounted in the ends of a yoke 14. The yoke 14 has at its center a concave bearing 15 to receive and support a cone pivot 16 mounted on a block 17 adjustably secured in the bracket 8. A hook shaped guard 18 secured to the block 17 fits loosely under the yoke 14 to prevent disengagement of the bearing 15 from the cone pivot 16.

To provide for adjustment to correct errors in weight indication the block 17 is made adjustable in the bracket 8. The adjustment is effected by a shouldered screw 19 that is threaded into the end of the block 17 and that engages a lip 20 of the bracket 8 between its shoulder 21 and its head 22. The screw 19 is thus held against movement with respect to the bracket 8 so that when it is rotated the block 17 is moved lengthwise of the lever 9. The block 17 is held in place in the bracket 8 by a cap screw 23 forcing a spring washer 24 into resilient engagement with the upper surface of the bracket 8. A stop collar 25 allows the cap screw 23 to be tightened without rigidly clamping the spring 24.

The bracket 8 is shaped like an inverted trough or channel having a pair of wings 26 overlying end surfaces of the lever 9 to which it is attached by bolts 27. At its other end it has forwardly extending wings 28 to carry a thin plate connecting member in the form of a cross piece 29. The connecting member, the crosspiece 29, is thus attached to the main lever 9. The cross piece 29 has slots 30 through which screws 31 are passed to attach the cross piece 29 to the forwardly extending wings 28. The slots allow the cross piece to be adjusted in a horizontal direction transversely of the lever 29. The center portion of the cross piece 29 is coined or punched to provide a conical depression or socket 32 that receives a pointed end of a strut 33. The upper end of the strut 33 is also pointed and is engaged in a similar conical recess 34 in a second connecting member in the form of a thin plate or short strip 35 attached to the lever 6. Each of the conical depressions 32 or 34 terminates in a more or less pointed bottom the effective radius of curvature of which is as small as may conveniently be made and preferably less than .005 inch. In the drawing no curvature is shown in the conical depressions. This lack of curvature is desirable but not necessary as long as the effective radius is small. Each of the pointed ends of the strut 33, as may be seen in Figure V, terminates in a rounded tip the radius of curvature of which is preferably less than .007 inch but greater than the effective radius of curvature of the conical bottom of the depression. Thus the ends of the strut 33 cooperate with the conical sockets 32 or 34 in the manner of a ball and socket joint. The line of contact is substantially a circle of small radius the center of which is on the axis of the strut 33.

While this arrangement violates the principle that the pivotal connection should have rolling contact between a sharply pointed end of the strut and the shallow socket of the cross member so as to secure a minimum of friction, it nevertheless offers the advantage that the strut and conical depression always take the same position with respect to each other regardless of the oscillation of the levers. Thus greatly improved stability of dimension is obtained at the expense of a negligible increase in friction in the scale. To secure these improved results it is necessary that the radius of curvature on the tip of the strut be greater than the radius of curvature of the bottom of the conical depression and that both of the radii of curvature be as small as may be conveniently produced.

Disengagement of the tips of the strut 33 from the conical depressions 32 or 34 is prevented by a generally C-shaped check bar or yoke 36 that has a lower end 37 loosely juxtaposed to the lower surface of the cross piece 29 directly opposite the conical tip of the strut 33. The yoke 36 also has an extended upper portion 38 that passes closely adjacent to the upper surface of the short strip 35 attached to the lever 6. This yoke thus serves as a check to prevent separation of the strut from the depressions 32 or 34. It is held in position by a pair of spring clips or clasps 39 riveted, welded or otherwise secured to the yoke 36 and resiliently engaging the strut 33. The upper horizontal portion 38 of the yoke 36 is made of sufficient length and weight that the assembly of the yoke 36 and the strut 33 is balanced about the axis of the strut. It therefore has little or no tendency to turn about a vertical axis and thus no frictional force can be developed between the sides of the yoke 36 and the connecting members the cross piece 29 or short strip 35 of the chart drive transverse and main levers.

The particular improved assembly offers many advantages over the pin connected link ordinarily employed to connect the weighing or main lever and the cross or chart drive lever of this type of weighing scale. The improved construction provides positive positioning of the strut with respect to the operatively connected members. Its construction provides a number of straight edges parallel to the strut so that its alignment in the scale may be easily observed. The ball and socket joint obtained by making the radius of curvature of the rounded ends of the conical points of the strut greater than the effective radius of curvature of the receiving depressions prevents any wandering of the strut from its adjusted position and thus maintains a precise dimensional stability between the levers without introducing any objectionable friction.

Various modifications may be made in specific details of construction without departing from the spirit and scope of the invention.

Having described the invention, I claim:

1. In a device for operatively connecting levers of a weighing scale, in combination, a first lever, a member attached to the lever, said member having a generally conical depression therein, a second lever, a second member attached to the second lever, said second member having a generally conical depression facing the depression in the first member, a strut having its ends engaged in the depressions, each of the ends having a radius of curvature that is greater than the effective radius of curvature of the bottom of the depression receiving such end, and means for preventing such separation of said members as would permit disengagement of the strut from the members.

2. In a device for operatively connecting levers of a weighing scale, in combination, a first lever, a member attached to the lever, said member having a generally conical depression therein, a second lever, a second member attached to the second lever, said second member having a generally conical depression facing the depression in the first member, a strut having rounded ends engaged in the conical depressions, each of the rounded ends having a radius of curvature that exceeds the effective radius of curvature of the engaged conical depression, and a check bar supported by the strut, said check bar having ends that are juxtaposed to said members on the sides opposite the depressions.

3. In a device for operatively connecting levers of a weighing scale, in combination, a first lever, a thin plate attached to the lever, said plate having a conical depression on one side and a corresponding protuberance on the opposite side, a second lever, a second thin plate attached to the second lever, said second plate having a depression on the side facing the first plate and having a protuberance on its other side, a strut having pointed ends engaged in the depressions, each of said pointed ends terminating in a rounded portion having a radius of curvature greater than the effective radius of curvature at the bottom of the engaged depression, and means for preventing disengagement of the strut and plates.

4. In a device for operatively connecting levers of a weighing scale, in combination, a first and a second lever to be operatively connected, a strut, the strut having pointed ends terminating in small spherical sections, each of said levers having a thin portion incorporating a generally conical depression, the minimum radius of curvature at the bottom of the depressions being less than the radius of the spherical sections of the strut, and a yoke supported on the strut, the yoke having portions juxtaposed to the thin lever portions opposite the ends of the strut to prevent disengagement of the strut and lever portions.

LAWRENCE S. WILLIAMS.

References Cited in the file of this patent

UNITED STATES PATENTS

| Number | Name | Date |
|---|---|---|
| 702,927 | Culmer | June 24, 1902 |
| 1,355,942 | Cross | Oct. 19, 1920 |
| 1,406,780 | Thompson | Feb. 14, 1922 |
| 1,565,251 | Bousfield | Dec. 15, 1925 |
| 1,569,608 | Bergen | Jan. 12, 1926 |

FOREIGN PATENTS

| Number | Country | Date |
|---|---|---|
| 466,992 | Germany | Oct. 16, 1928 |
| 897,425 | France | Mar. 21, 1945 |